United States Patent [19]
Mary

[11] 3,813,166
[45] May 28, 1974

[54] OPTICAL DISPLACEMENT INDICATOR
[75] Inventor: Donald J. Mary, New Carrolton, Md.
[73] Assignee: The United States of America as represented by the Secretary of the Army, Washington, D.C.
[22] Filed: Mar. 7, 1973
[21] Appl. No.: 338,795

[52] U.S. Cl. ................... 356/28, 350/285, 350/294, 73/517 R, 356/4
[51] Int. Cl. ............................................. G01p 3/36
[58] Field of Search ......... 356/28, 4; 350/285, 293, 350/294; 73/517 R

[56] References Cited
UNITED STATES PATENTS

| | | | |
|---|---|---|---|
| 3,245,307 | 4/1966 | De Lang | 356/4 |
| 3,369,119 | 2/1968 | Brachvogel | 250/458 |
| 3,431,417 | 3/1969 | Chope | 73/517 R |
| 3,764,200 | 10/1973 | Glättli | 350/285 |

*Primary Examiner*—Richard A. Farley
*Assistant Examiner*—S. C. Buczinski
*Attorney, Agent, or Firm*—Edward J. Kelly; Herbert Berl

[57] ABSTRACT

An optical device for measuring the displacement of a remote object. In a preferred embodiment, the device consists of two major subassemblies. One assembly consists of a light source which projects a collimated light beam towards the object whose displacement is to be measured. Associated with the light source is a beamsplitter which diverts any light reflected back from the direction of the object onto a photoelectric cell. The other assembly is located near the object and in the path of the collimated light beam. This assembly consists of a hollow cone whose inside surface is specularly reflective. A plunger is fixed to slide along the axis of the cone. The plunger protrudes through a hole cut into the apex of the cone. A small flat mirror is fastened to the end of the plunger that projects inside the cone. The other end of the plunger rests against the object. The plunger is spring loaded to maintain contact with the object. The light in the collimated beam that enters the open end of the cone is reflected by the inner surface of the cone in such a manner that all the rays of light cross the axis of the cone. The apex angle of the cone is chosen so that, even by multiple reflections within the cone, any rays emerging from the mouth of the cone do not find their way back to the photocell; that is, the cone alone is not a retroreflector. The small mirror on the end of the plunger, however, intercepts a portion of the light rays as they cross the cone axis and redirects them so that, upon reflection from the opposite wall of the cone, the light rays emerge travelling in the direction of the photocell. As the object moves, the plunger slides along the axis of the cone (the cone being stationary) and the amount of light reflected back to the photocell changes. Furthermore, the amount of light reflected back to the photocell is a linear function of the position of the plunger and, hence, of the position of the object. The photocell current is measured by a meter whose scale is calibrated in units of length.

9 Claims, 10 Drawing Figures

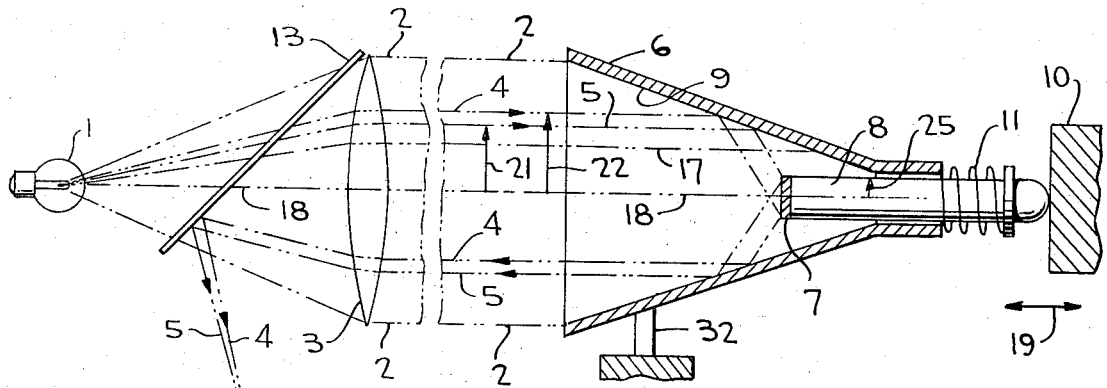
FIG. 1a
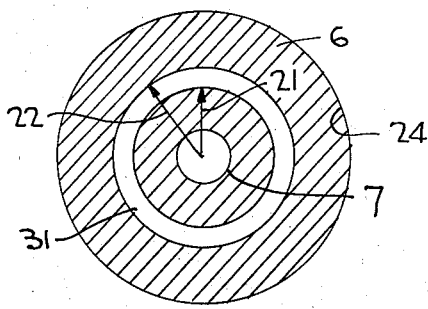
FIG. 1b
FIG. 2
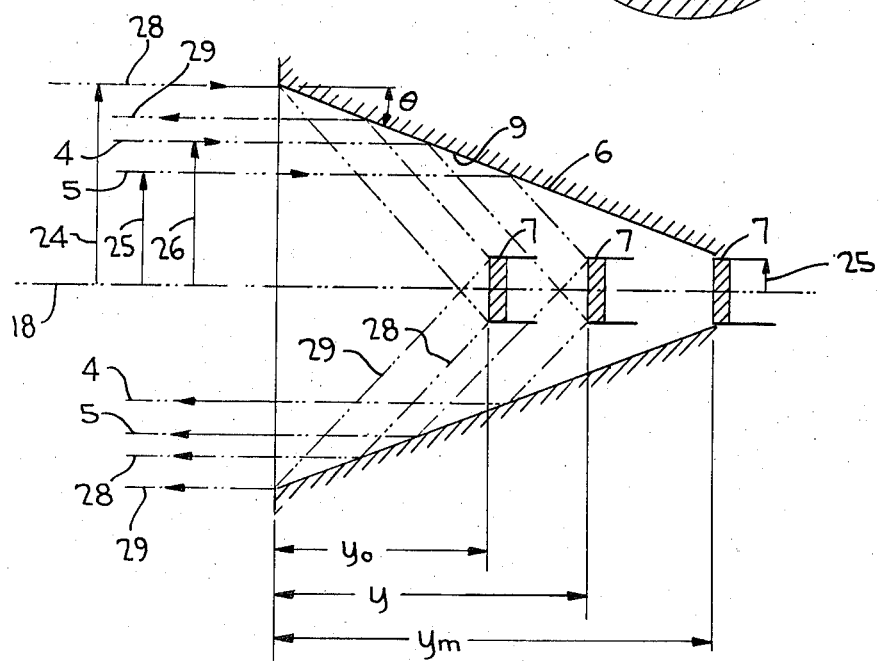

> 3,813,166

OPTICAL DISPLACEMENT INDICATOR

RIGHTS OF GOVERNMENT

The invention described herein may be manufactured, used, and licensed by or for The United States Government for governmental purposes without the payment to me of any royalty thereon.

BACKGROUND OF THE INVENTION

1. Field of the Invention

This invention relates to remote optical sensors and, more particularly, to a device for measuring the displacement, acceleration, etc., of a remotely located object.

2. Description of the Prior Art

Remote sensing of the displacement of an object is required in circumstances where the object is inaccessible, in rapid motion, in a dangerous environment, or where the physical presence of the experimenter might bias the results. Current methods of remotely sensing displacement include photography, visual measurement through a telescope (a cathetometer), interferometric devices, doppler systems (both microwave and optical types), and others. Each of these techniques is characterized by one or more disadvantages. These disadvantages may include inability to follow rapid motion, inability to follow very slow motion, time consuming measurements, tedious analysis of the measurements, delicate instrumentation which will not stand a severe environment, displacement values not available in real time (as in photography), and so forth.

It is therefore a primary object of the present invention to provide a method of measuring the displacement of a remotely located object.

Another object is to provide an optical displacement indicator that, in a variety of environments, includes the ability to detect a wide range of object speeds.

A still further object is to provide an optical displacement indicator whose measurements are easy to record, quick to analyze and are not time consuming.

Another object is to provide an optical displacement indicator that yields a real time read out of object displacement.

SUMMARY OF THE INVENTION

Briefly, in accordance with the invention, an optical displacement indicator is provided which comprises means for directing a collimated beam of light towards the object whose displacement is to be measured. In one embodiment a hollowed out cone whose inside surface is reflective is positioned along the axis of the incoming beam. The apex of the reflecting cone contains a plunger assembly that is free to move in such a manner so as to maintain contact with the object of the measurement outside the cone. A small plane mirror is positioned on the end of the plunger inside the cone and is adapted to reflect some of the incoming beam back towards a detector. The amount of light so reflected is proportional to the location of the plunger along the axis of the cone and thus, to the displacement of the object in spring-loaded juxtaposition to the plunger. Other embodiments are presented herein which modify the basic cone/plunger assembly to provide acceleration and deceleration read outs and both linear and non-linear read outs of displacement vs. detected light.

BRIEF DESCRIPTION OF THE DRAWINGS

The specific nature of the invention as well as other objects, aspects, uses, and advantages thereof will clearly appear from the following description from the accompanying drawing, in which:

FIGS. 1a and 1b are schematic cross sections of the arrangement of the optical components according to a preferred embodiment of my invention;

FIG. 2 shows the geometry relating the size and location of the reflected annulus of light to the position of the plunger;

DESCRIPTION OF THE PREFERRED EMBODIMENTS

Figure 3A:
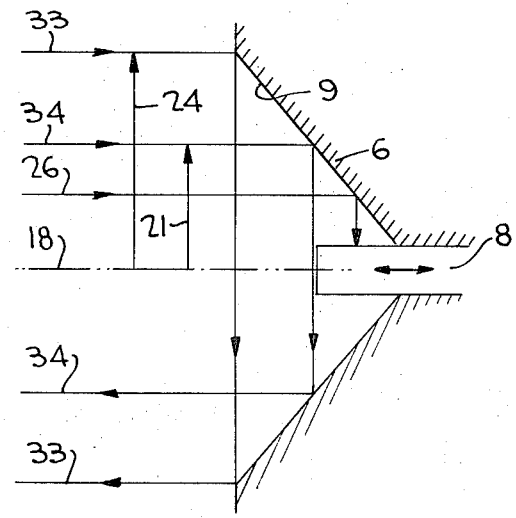
FIGS. 3a and 3b indicate another embodiment of my invention using a cone with a 45 - degree half-angle.

FIG. 1(a) is a schematic representation of one embodiment of my invention shown in cross section. A light source 1 and a lens 3 form a collimated beam 2 which is directed towards object 10, some distance away. In the vicinity of object 10, the beam is intercepted by a hollow cone 6 whose inner surface 9 is highly reflective. Sliding along the axis 18 of cone 6 is a plunger 8. On one end of the plunger 8 is a flat mirror 7. The other end of the plunger is in contact with object 10, whose displacement along the direction 19 is to be measured. A spring 11 ensures that the contact between the plunger and object is maintained as the object moves. Cone 6 is rigidly fixed by support 32 so that it does not move relative to lens 3. Of all the light rays in the beam 2 that enter the mouth of cone 6 only those rays whose distances from axis 18 are between the radii 21 and 22 become incident on mirror 7. All other rays, for example ray 17, either do not emerge or emerge at such an angle that they do not enter lens 3. For the particular location of mirror 7 indicated, however, rays 4 and 5 (and all other rays within the annulus of radii 21 and 22) are reflected by mirror 7. After an additional reflection from inner surface 9 they proceed back through lens 3. Here the rays are diverted by beamsplitter 13 and come to a focus on photocell 14.

FIG. 1(b) indicates how the cone 6 might appear to an observer at lens 3 looking toward object 10. The inner surface of cone 6 and the mirror 7 would appear dark (the shaded area) except for a bright annulus 31 of reflected light. The area of this annulus is, for a specified cone geometry and mirror (7) size, dependent only on the position of mirror 7 along the cone axis 18, and hence, the position of object 10. The maximum area of annulus 31 occurs when for a certain position of mirror 7 the radius 22 equals the radius 24 of cone 6. The minimum area of annulus 31 corresponds to the position of mirror 7 where radius 21 equals the radius 25 of mirror 7. It is clear, then that the amount of light reflected back towards lens 3 and photocell 14 (via beamsplitter 13) is proportional to the position of mirror 7 and, hence, object 10. An indicating device 15, such as a current meter, or the like, measures the current through photocell 14. If photocell 14 is operated in the linear portion of its response curve then the reading of device 15 will be a linear function of the position of object 10.

The geometry of cone 6 and the associated reflections are illustrated in cross section in FIG. 2. If the collimated beam fills the open mouth of the cone there will be rays, such as 28 and 29, that are reflected just at the rim of the cone mouth. These rays are incident on the inner surface 9 at a radius 24, equal to the radius of the mouth of the cone. In order for the rays to be retroreflected back to lens 3, mirror 7 must be a distance $y_o$ from the mouth of the cone. If the mirror 7 is closer to the mouth of the cone than distance $y_o$ a complete annulus of light will not be reflected. Position $y_o$ of mirror 7 represents that location at which the largest complete annulus 31 (FIG. 1(b)) of light is reflected back to lens 3. The area of this annulus (corresponding to $y_o$) is designated $A_o$.

Conversely, the smallest annulus 31 of light is reflected back towards lens 3 when mirror 7 is at a distance $y_m$ from the mouth of cone 6. At this location mirror 7 is at the small opening and $y_m$ represents the length of the truncated cone 6. At any other position of y of mirror 7 between $y_o$ and $y_m$, the area of the reflected annulus 31 will have a value between that of the largest annulus (7 at $y_o$) and that the smallest annulus (7 at $y_m$).

Let the area of annulus 31 when mirror 7 is at position y be designated A. then $(A/A_o) = [R (1-n) - r \cos 2\theta(1-2n) + nr]/(R - r \cos 2\theta)$ where R is the radius 24 of the mouht of cone 6, r is the radius 25 of mirror 7, $\theta$ is the angle the wall of cone 6 makes with the cone axis 18 (one half the total apex angle of the cone), and n is any number between 0 and 1. Assigning different values to n corresponds to locating mirror 7 at various locations of y between $y_o$ and $y_m$. n is related to y by the expression $$y = y_o + n(y_m - y_o).$$

Also, $y_o = (R+r/\tan 2\theta)$ and $y_m = (R-r/\tan \theta)$ where R, r, and $\theta$ are as previously defined. The change in the ratio ($A/A_o$) as n varies from 0 to 1 represents the change in current through the photocell 14 as the plunger (and mirror 7) shifts from $y_o$ to $y_m$. The total diplacement D that can be measured with a particular cone geometry is given by
$D = y_m - y_o = (R-r/\tan \theta) - (R+r/\tan 2\theta)$.

Figure 3B:
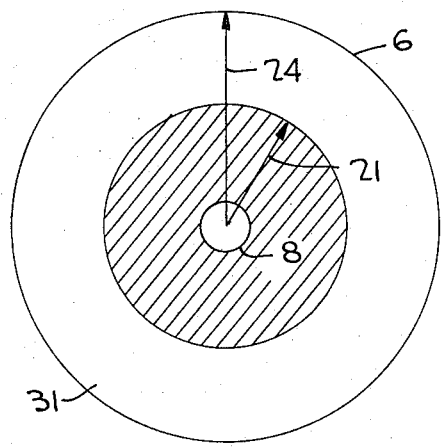

Several variations in the physical shape and use of the basic invention are possible. For example, in FIG. 3(a), the angle $\theta$ of cone 6 (shown in cross section) is made to be 45°, and the light rays reflected from the inner wall 9 cross axis 18 at right angles. The light rays such as 33 and 34 pass the plunger 8 parallel to its face. Clearly, mirror 7 of FIG. 2 cannot be used in this case. Any other ray such as 26 entering the cone 6 at a distance less from axis 18 than ray 34 is intercepted by the plunger 8 and is not retroreflected. FIG. 3(b) shows the appearance of cone 6 as seen from lens 3 with plunger 8 partially recessed. The annulus 31 of reflected light for this variation, has a constant outer radius 24 equal to the radius of the mouth of the cone 6. The inner radius 21 of annulus 31 is a function of the location of the end of plunger 8. The area of annulus 31, and, hence, the current through photocell 14 (FIG. 1), is dependent on the displacement of plunger 8. However, in this variation, the area (or photocell current) in not a linear function of the plunger displacement. The total range of light variation is greater in this embodiment since the light varies from zero when the end of the plunger is flush with the mouth of the cone to maximum (almost the entire incident beam being reflected) when the plunger is fully recessed and flush with the throat or small end of the cone. Thus, this embodiment would provide a greater light change for unit displacement of the plunger than the geometry shown in FIG. 1. This is accomplished at the loss of linearity of response.

Figure 4:
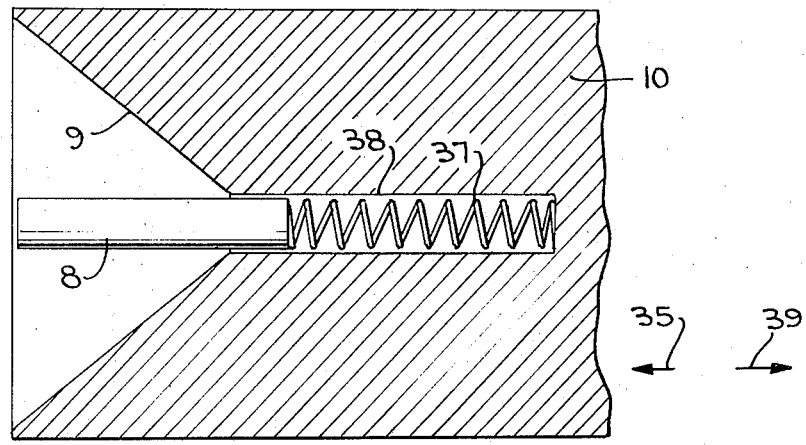
FIG. 4 indicates how the device of the present invention can be used as an accelerometer.

FIG. 4 illustrates in cross section an embodiment where the cone and plunger are used to measure longitudinal acceleration. The cone reflecting surface 9 is a part of or rigidly attached to object 10 whose longitudinal acceleration is to be measured. Plunger 8 slides freely in cavity 38 but is held in the fully extended position when object 10 is at rest by a weak spring 37. As object 10 begins to accelerate in the direction 35, the inertia of plunger 8 overcomes the force of spring 37 and the plunger begins to recede into the cone. The action then proceeds exactly the same as in variation (a), above. A displacement versus time curve of the plunger motion can be generated which will yield the acceleration profile of object 10.

This embodiment can also be used to measure deceleration. If object 10 is moving at a constant speed in direction 39, spring 37 will hold plunger 8 in the fully extended position. As object 10 begins to decelerate in the direction 39 the momentum of plunger 8 overcomes spring 37, and the plunger begins to recede into the cone. From the resulting displacement versus time curve of the plunger the deceleration of object 10 can be determined.

Other arrangements of spring 37 and plunger 8 suggest themselves for measuring acceleration in direction 39 or deceleration in direction 35.

The advantage of this device for measuring longitudinal acceleration, is that the device is not dependent on the mechanical or physical properties of materials, as are many of the accelerometers currently in use.

This embodiment (FIG. 4) is illustrated using the 45-degree cone depicted in FIG. 3. Clearly, the cone geometry outlined in FIG. 1 can be used equally well.

Figure 5:
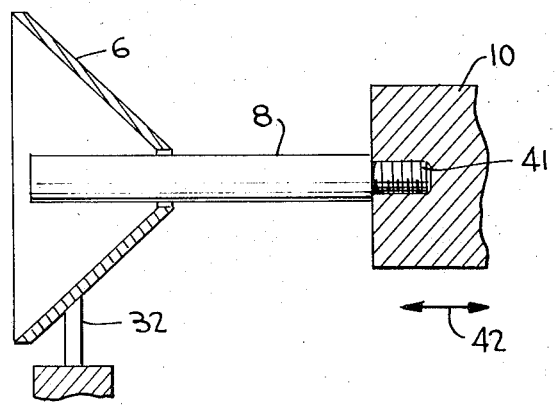
FIG. 5 shows how my invention can be used to measure vibration.

FIG. 5 shows in cross section an embodiment of the invention used to measure vibration. Here, plunger 8 is rigidly fastened to object 10 by threaded stud 41, or by some other means. Cone 6 is supported by a rigid support 32 so that the cone does not move. Obviously, as object 10 vibrates in the directions 42, the plunger will be similarly affected. The variation in the area of annulus 31 (FIG. 3) will depend directly on the motion of object 10 and frequency and amplitude of the vibration of the object can be readily determined. Either cone geometry shown in FIG. 1 or FIG. 3 may be used.

Figure 6A:
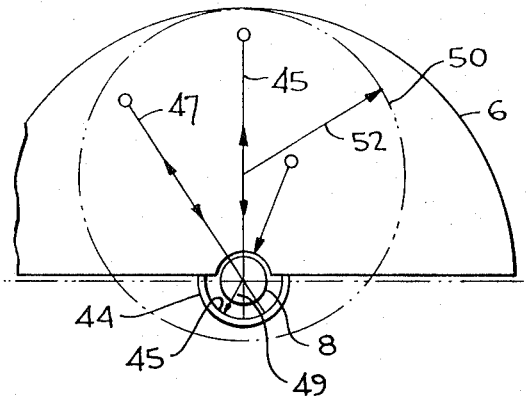
FIGS. 6a and 6b show a modification of the 45 - degree cone which produces a larger displacement range for a given size cone.
Figure 6B:
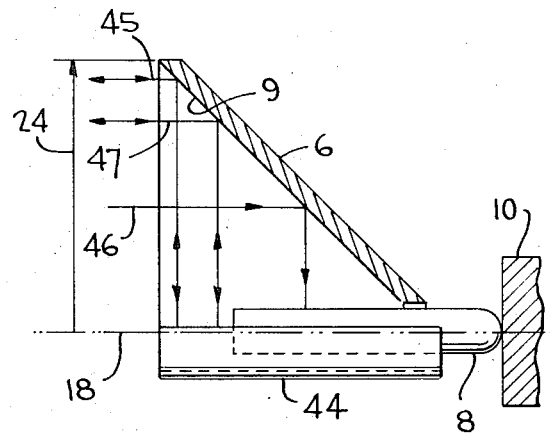

FIG. 6 illustrates in cross section another variation of the embodiment shown in FIG. 3, where the cone angle is 45°. Here, plunger 8 contacts object 10 in a manner exactly as in FIG. 1 or FIG. 5, although the method of attachment or contact is not shown for clarity. The lower half of cone 6 has been removed and replaced a semicylinder 44 whose inner surface 45 is specularly reflective. The axis of cone 6, plunger 8, and semicylinder 44 are made coincident along line 18. The radius 49 of semicylinder 44 is unimportant so long as it is greater than the radius of plunger 8.

As plunger 8 recedes into the cone due to a displacement of object 10, rays such as 45 and 47 reflected by cone surface 9 pass through cone axis 49. At this point the light rays are reflected back on themselves, pass through axis 18 again, and become incident on surface 9 at the same points at which the individual rays originally entered the system. They are then reflected by surface 9 back to lens 3 (FIG. 1). 46 represents a ray intercepted by plunger 8. The overall effect of this variation is the same as that shown in FIG. 3, except that only a portion of the annulus is generated. The usefulness of this variation results from the offset of axis 18. If, as shown in FIG. 6(a), cone 6 is trimmed to fit inside a circle 50 of radius 52, the total displacement of plunger 8 which could be utilized is almost twice that of the variation shown in FIG. 3. This is because in FIG. 6 the radius 24 of cone 6 is nearly twice that of radius 52, whereas, if the variation in FIG. 3 had to fit inside circle 50, the cone radius 24 would be equal to the circle radius 52. The change in the amount of light reflected as a function of plunger displacement is nonlinear in this variation. But, as in all the other variations, the amount of light reflected depends on the physical geometry and the response to plunger movement can be predicted.

Figure 7:
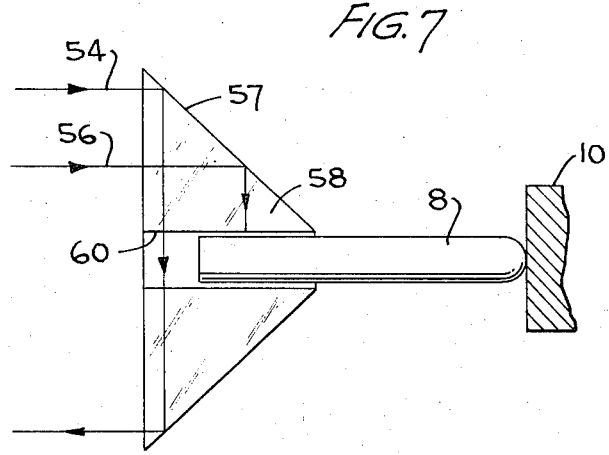
FIG. 7 indicates another embodiment that utilizes a solid cone made of transparent material.

FIG. 7 shows a variation where a solid transparent cone 58 is substituted for the hollow cone 6 (FIG. 3). A central hole 60 drilled into cone 58 provides a passage for plunger 8. A typical ray 54 which is reflected by cone surface 57, passes through the central hole and emerges from the opposite side. Another ray 56 is shown intercepted by the plunger. Again, movement of object 10 causes this variation to function exactly like that shown in FIG. 3. If the cone angle is 45 total internal reflection will occur at surface 57 and no reflecting coating is required. If the cone angle is less than 45° the geometry of FIG. 1(a) applies and a reflecting coating must be used on surface 57.

Since the operation of this invention depends on the relative movement between the plunger and the cone, all of the variations mentioned can be reversed. That is, the plunger can be made fixed and the cone coupled to the object. The function will be exactly as before.

I wish it to be understood, I do not desire to be limited to the exact details of construction shown and described, for obvious modifications will occur to a person skilled in the art.

I claim as my invention:

1. An optical device for measuring the displacement of a remote object, comprising;
   a. means for directing a collimated beam of light towards said object;
   b. reflecting means adjacent to said object and in the path of said collimated beam of light;
   c. means for receiving a portion of said beam after reflection by said reflecting means; and
   d. said reflecting means comprising a cone having an opening at its apex and an inside surface that is specularly reflective plus means in contact with said object that varies the amount of light returned to said receiving means in proportion to the displacement of said object.

2. The optical device of claim 1 wherein said light varying means comprises a plunger having first and second ends, said first end of which protrudes through said opening at the apex of said cone to rest upon said object whose displacement is to be measured.

3. The optical device of claim 2 wherein said light varying means further comprises means for maintaining contact between said plunger and said object.

4. The optical device of claim 3 wherein said light varying means further comprises a reflecting surface located on the second end of said plunger positioned such that a portion of said incoming beam is reflected back towards said receiving means.

5. The optical device of claim 3 wherein the angle formed by said inside surface of said cone and said plunger is 45° whereby all incoming light from said collimated beam is reflected by said surface so as to cross the axis of said cone at right angles.

6. The optical device of claim 3 wherein said cone comprises a semi-conical surface obtained by the bisecting of said cone along its longitudinal axis.

7. The device of claim 6 further comprising a semi-cylindrical reflector having its longitudinal axis coincide with said axis of said semi-conical surface and positioned adjacent said plunger so as to reflect any incident light back upon itself.

8. The optical device of claim 3 wherein said cone comprises a solid transparent material having a cylindrical hole formed along its longitudinal axis for receiving said plunger.

9. The optical device according to claim 3 wherein said receiving means comprises a beamsplitter and means for detecting the variation in light of the return beam.

* * * * *